United States Patent
Sell

(10) Patent No.: US 7,013,071 B2
(45) Date of Patent: Mar. 14, 2006

(54) METHOD AND DEVICE FOR ACHIEVING OPTICAL ALIGNMENT USING LASER PULSES

(75) Inventor: John E. Sell, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 248 days.

(21) Appl. No.: 10/335,121

(22) Filed: Dec. 31, 2002

(65) Prior Publication Data

US 2004/0124345 A1    Jul. 1, 2004

(51) Int. Cl.
*G02B 6/30* (2006.01)
(52) U.S. Cl. .......................... 385/52; 385/39
(58) Field of Classification Search .................. 385/91, 385/39, 51, 52, 88
See application file for complete search history.

(56) References Cited

U.S. PATENT DOCUMENTS

| | | | |
|---|---|---|---|
| 5,033,052 A * | 7/1991 | Masuko et al. | 372/36 |
| 5,712,463 A | 1/1998 | Singh et al. | |
| 6,011,239 A | 1/2000 | Singh et al. | |
| 6,416,937 B1 * | 7/2002 | Flanders et al. | 430/321 |
| 6,438,279 B1 * | 8/2002 | Craighead et al. | 385/12 |
| 6,553,174 B1 * | 4/2003 | Winer | 385/137 |
| 6,614,605 B1 * | 9/2003 | Auracher et al. | 359/824 |
| 6,625,372 B1 * | 9/2003 | Flanders et al. | 385/134 |

OTHER PUBLICATIONS

Zhang, X.R. et al., "Microscale Bending using Pulsed and CW Lasers", in *Laser Applications in Microelectronic and Optoelectronic Manufacturing IV*, Malcolm C. Gower, Henry Helvajian, Koji Sugioka, Jan J. Dubowski, Editors, Proceedings of SPIE vol. 4274, pp. 58-65, San Jose, CA (Jan. 22-24, 2001).

* cited by examiner

Primary Examiner—John D. Lee
Assistant Examiner—James D. Stein
(74) *Attorney, Agent, or Firm*—Blakely, Sokoloff, Taylor & Zafman LLP

(57) ABSTRACT

An optical element is aligned on a flexure by applying multiple laser pulses to the flexure. Additional laser pulses are applied until the optical element is aligned properly.

23 Claims, 3 Drawing Sheets

METHOD AND DEVICE FOR ACHIEVING OPTICAL ALIGNMENT USING LASER PULSES

FIELD

The subject matter disclosed herein generally relates to the field of optical devices, and in particular, to alignment of an optical device.

DESCRIPTION OF RELATED ART

Optical elements, such as an optical fiber, lens, mirror, wave guide, etalon, gain medium and so forth, need to be aligned properly for an optical signal to be propagated along an optical pathway including the optical elements. In some cases, the alignment precision is in the sub-micron range. Mechanical alignment is difficult at this level of precision.

BRIEF DESCRIPTION OF THE DRAWINGS

FIG. 3A is a side view and FIG. 3B is a top view.

Note that use of the same reference numbers in different figures indicates the same or like elements.

DETAILED DESCRIPTION

An optical element is mounted to a deformable flexure using solder or epoxy. The optical element is then aligned and the flexure is attached to a substrate. Typically some mis-alignment results from the attachment process, commonly referred to as "solder shift", "epoxy shift" or "weld shift" depending on the attachment method. After attachment, the optical alignment is measured. Laser pulses are applied to the flexure structure until the optical element is aligned.

Figure 1:
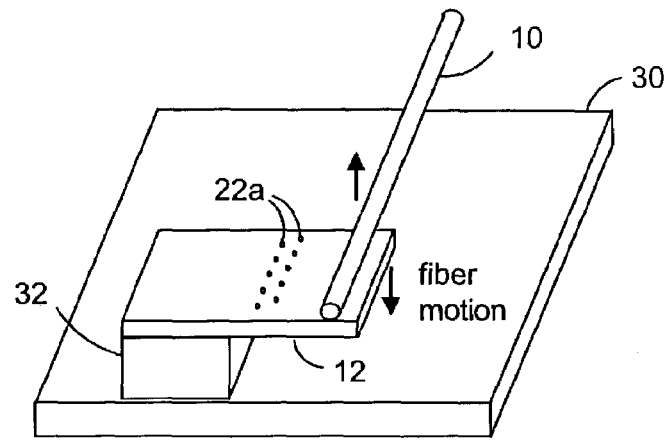
FIG. 1 is a schematic diagram showing one embodiment of aligning an optical element.

FIG. 1 is a schematic diagram showing one embodiment of aligning an optical element. In one case, the optical element is an optical fiber 10. The optical fiber 10 is mounted to a flexure 12. One or more laser pulses are applied to the flexure material at various locations 22a, and reflow areas are formed on the flexure, the reflow areas causing the flexure to bend as they cool. If the laser pulses are provided on a top surface of the flexure, then the flexure will bend upwards towards the laser source. If laser pulses are provided on a bottom surface of the flexure, then the flexure will bend downwards towards the laser source.

In one embodiment, the flexure is mounted on a substrate 30 via a spacer 32. The flexure is typically relatively thin, for example, approximately 20 to 150 microns. In one embodiment, the flexure comprises a metal. In another embodiment, the flexure comprises a ceramic. By controlling the laser pulse, optical alignment down to sub-micron precision is achievable.

In one embodiment, the laser pulse is controlled by such variables as laser pulse location and spatial density, laser beam diameter, power, frequency, and duration of the laser pulse. The laser pulse may be provided by a pulsed laser, or alternatively, provided by a continuous wave laser.

In one example, a pulsed laser has a wavelength on the order of 1 micron, with pulse width on the order of 100 ns, a pulse repetition of approximately 20 kHz, a power of 1 W, and a laser beam diameter on the order of 50–60 microns. In another example, a continuous wave laser has a wavelength on the order of 1 micron, power on the order of 10 W, and a laser beam diameter on the order of 60–70 microns.

Figure 2:
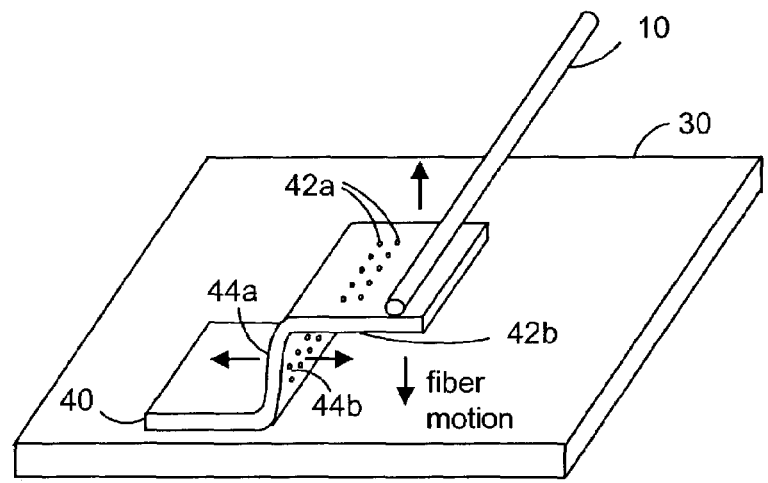
FIG. 2 is a schematic diagram showing another embodiment of aligning an optical element.

FIG. 2 is a schematic diagram showing another embodiment of aligning an optical element. In this embodiment, the flexure 40 is mounted directly to the substrate 30. Applying laser pulses to the top surface of the flexure at points 42a allows the flexure to be moved in an upward direction similar to that described with respect to FIG. 1. Similarly, applying laser pulses to the bottom surface of the flexure at points 42b allows the flexure to be moved in a downward direction. Similarly, applying laser pulses to the points 44a and 44b of the flexure allows the flexure to be moved in a lateral direction toward the laser source.

Figure 3A:
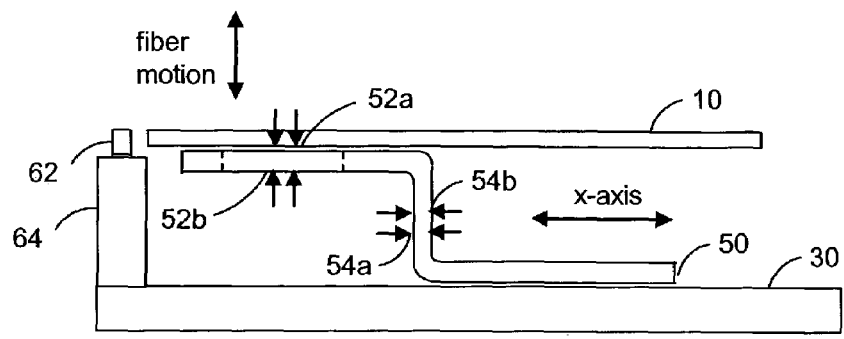
FIGS. 3A and 3B are schematic diagrams showing another embodiment of aligning an optical element.
Figure 3B:
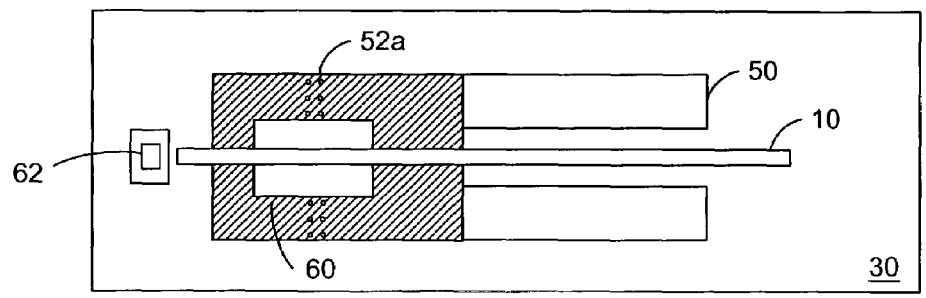

FIGS. 3A and 3B are schematic diagrams showing another embodiment of aligning an optical element. FIG. 3A is a side view and FIG. 3B is a top view. Applying laser pulses to points 52a on a top surface of a flexure 50, cause the optical element 10 to rise upward in an angular direction (as opposed to FIG. 1, in which the optical element was raised upward but stayed in a substantially horizontal plane). In one embodiment, the flexure may comprise a cutout area 60 with thin borders that are bent by applying the laser pulse(s).

Similarly, applying laser pulses to points 54a and 54b cause translation of the optical element along the x-axis as shown in the FIG. 3A.

In one embodiment, the optical element comprises an optical fiber. However, the optical element could be a mirror, lens, array of optical fibers, wave guide, etalon, gain medium, and so forth. In one embodiment, an optical transmitter, such as a laser source (not the laser source used to apply laser pulses to the flexure) is coupled to the substrate 30, and the optical element 10 is aligned via the laser pulses to the optical transmitter. In another embodiment, an optical receiver, such as a photodetector is coupled to the substrate 30, and the optical element 10 is aligned via the laser pulses to the optical receiver. FIGS. 3A and 3B show an optical transmitter and/or optical receiver 62 aligned to optical element 10. In one embodiment, the optical transmitter and/or optical receiver 62 is mounted to a spacer 64 that is mounted to substrate 30.

Figure 4:
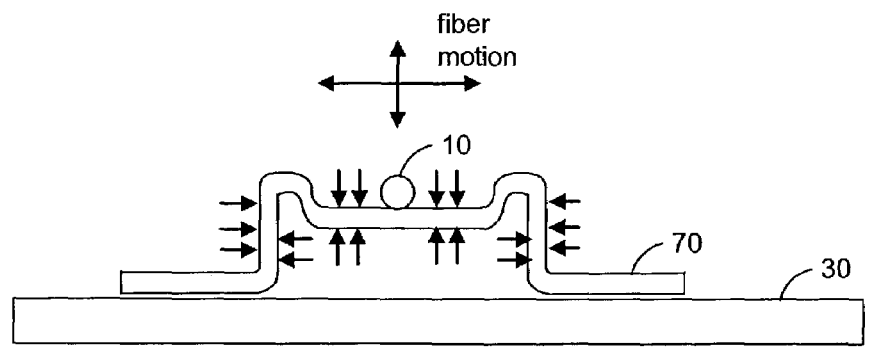
FIG. 4 is a schematic diagram showing another embodiment of aligning an optical element.

FIG. 4 is a schematic diagram showing a side view of another embodiment of aligning an optical element. In this embodiment, the flexure 70 is mounted to the substrate 30 in multiple places. Laser pulses may be applied to the flexure in multiple locations shown by the arrows to cause the optical element 10 to move. Alignment of the optical element 10 is measured and additional laser pulses are applied until the optical element is aligned properly. Applying laser pulses to the underside or interior of flexure 70 may be achieved by using an optical fiber, for example.

Figure 5:
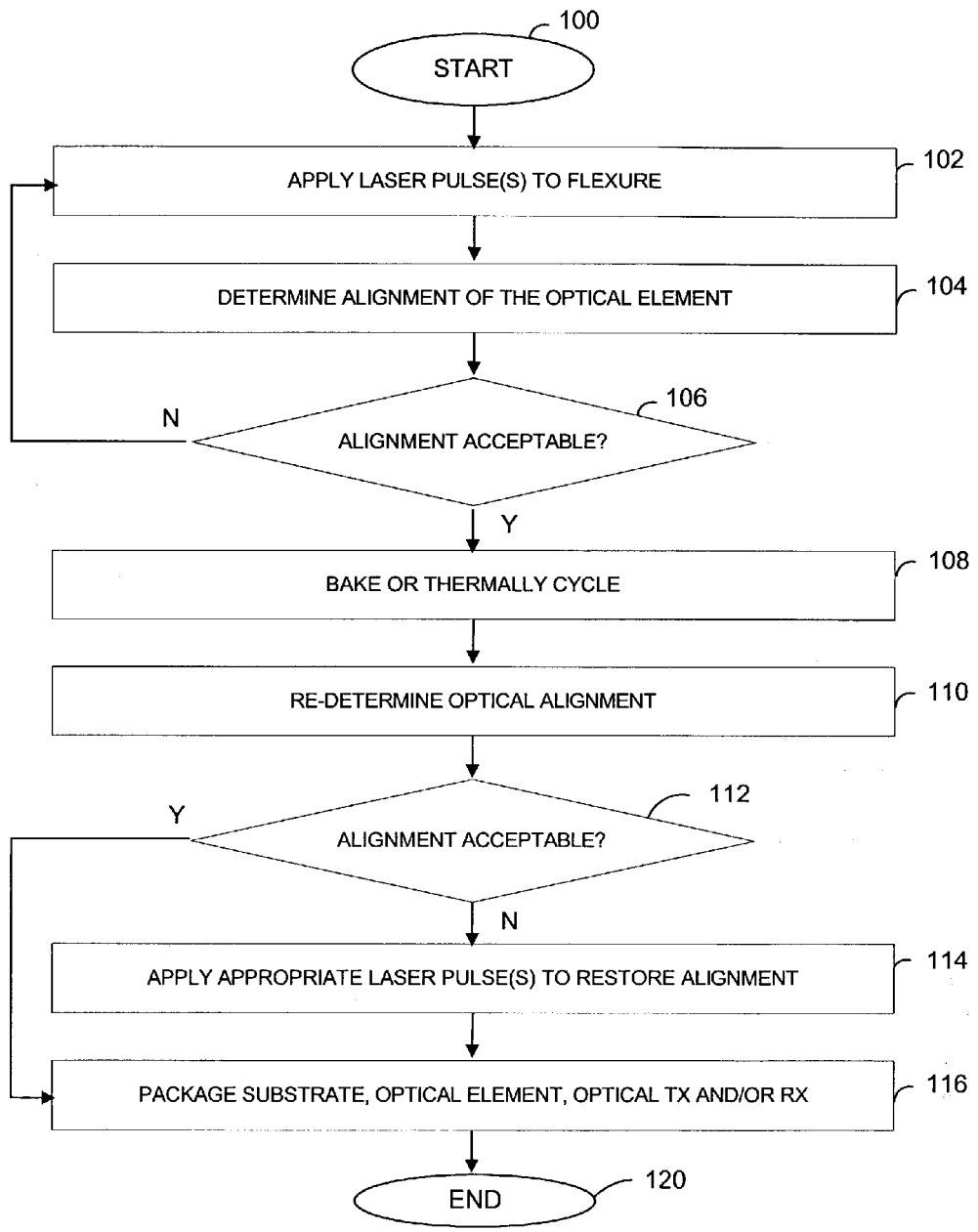
FIG. 5 is a flowchart showing an embodiment of aligning an optical element coupled to a flexure.

FIG. 5 is a flowchart showing an embodiment of aligning an optical element coupled to a flexure. The flowchart starts at block 100, and continues at block 102, at which multiple laser pulses are applied to the flexure. The laser pulses cause reflow areas to form on the flexure, and the reflow areas cause the flexure to bend as they cool. The flowchart continues at block 104, at which the optical alignment of the optical element is determined. In one case, the alignment is determined by measuring an amount of light passing through the optical element. In another embodiment, alignment may be determined by measuring a distance between the optical element and a reference point. At block 106, if the optical element is in the desired alignment, the flowchart continues at block 108. However, if the optical element is not in the desired alignment, then the flowchart returns to block 102 and the laser pulse(s) are re-applied.

Depending on the detected alignment, the location of a subsequent laser pulse application may be adjusted. In one embodiment, the laser pulses are provided at periodic locations along a linear path on the flexure. However, other methods of applying the laser pulses are possible. Variables such as location and spatial density, number of pulses, laser beam diameter, and duration, may be adjusted.

In one embodiment, the alignment process is performed in an assembly cycle, and after the alignment process is finished, no subsequent alignment is necessary.

In another embodiment, after the initial alignment process is completed, the optical element and flexure are subjected to one or more temperature cycles and/or baking at elevated temperatures. This puts stress on the part, and acts to stabilize the part and reduce shifting in the future.

The continuation of the flowchart of FIG. 5 illustrates putting the optical element through one optional thermal excursion such as temperature cycling or extended baking at elevated temperatures. For example, at block 108, the optical element is baked in an oven or thermally cycled. The flowchart continues at block 110, at which the optical alignment of the optical element is redetermined. At block 112, if the optical alignment is acceptable, then the flowchart continues at block 116. However, if the alignment is not acceptable, the flowchart continues at block 114, at which the optical alignment is modified by more laser pulses until optical alignment is achieved again, then the flowchart continues at block 116.

At block 116, the substrate, optical element, and optical transmitter and/or optical receiver are optionally packaged together, as shown in block 116. The flowchart ends at block 120.

Thus, a method and apparatus for aligning an optical element is disclosed. However, the specific embodiments and methods described herein are merely illustrative. Numerous modifications in form and detail may be made without departing from the scope of the invention as claimed below. The invention is limited only by the scope of the appended claims.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

What is claimed is:

1. A method of aligning an optical element coupled to a flexure, the method comprising:
   applying multiple laser pulses to the flexure to cause reflow areas to form on the flexure, the reflow areas causing the flexure to bend as they cool, wherein applying the multiple laser pulses comprises applying the multiple laser pulses on a side surface of the flexure to move the optical element laterally, and wherein applying the multiple laser pulses comprises applying the multiple laser pulses on a top surface of the flexure to move the optical element upward; and
   detecting alignment of the optical element and repeating applying the multiple laser pulses until the optical element is in alignment.

2. The method of claim 1, wherein applying the multiple laser pulses further comprises applying the multiple laser pulses on a bottom surface of the flexure to move the optical element downward.

3. The method of claim 1, wherein applying the multiple laser pulses comprises applying the multiple laser pulses from one selected from a continuous wave laser and a pulsed laser.

4. The method of claim 1, wherein the flexure is approximately 20 to 150 microns thick.

5. The method of claim 1, wherein the flexure comprises one selected from a metal and a ceramic.

6. The method of claim 1, further comprising aligning the optical element with sub-micron precision.

7. The method of claim 1, further comprising:
   putting the optical element and the flexure through temperature cycling and or baking; and
   then detecting alignment of the optical element and repeating applying the multiple laser pulses until the optical element is in alignment.

8. An apparatus comprising a flexure and an optical element, wherein the optical element is aligned as defined in claim 1.

9. A method of aligning an optical element coupled to a flexure, the method comprising:
   applying multiple laser pulses to the flexure to cause reflow areas to form on the flexure, the reflow areas causing the flexure to bend as they cool, wherein applying the multiple laser pulses further comprises applying the multiple laser pulses on a side surface of the flexure to move the optical element laterally, and wherein applying the multiple laser pulses further comprises applying the multiple laser pulses on a bottom surface of the flexure to move the optical element downward; and
   detecting alignment of the optical element and repeating applying the multiple laser pulses until the optical element is in alignment.

10. The method of claim 9, wherein applying the multiple laser pulses comprises applying the multiple laser pulses from one selected from a continuous wave laser and a pulsed laser.

11. The method of claim 9, wherein the flexure is approximately 20 to 150 microns thick.

12. The method of claim 9, wherein the flexure comprises one selected from a metal and a ceramic.

13. The method of claim 9, further comprising aligning the optical element with sub-micron precision.

14. The method of claim 9, further comprising:
    putting the optical element and the flexure through temperature cycling and or baking; and
    then detecting alignment of the optical element and repeating applying the multiple laser pulses until the optical element is in alignment.

15. An apparatus comprising a flexure and an optical element, wherein the optical element is aligned as defined in claim 9.

16. A method of aligning an optical element comprising:
    attaching a flexure to a substrate;
    attaching the optical element to the flexure;
    applying multiple laser pulses to the flexure to cause reflow areas to form on the flexure, the reflow areas causing the flexure to bend as they cool;
    applying multiple laser pulses to a side portion of the flexure to move the optical element laterally;
    applying multiple laser pulses to one or more of:
    (i) a top portion of the flexure to move the optical element upward; and
    (ii) a bottom portion of the flexure to move the optical element downward; and
    repeating applying the multiple laser pulses until the optical element is in alignment.

17. A method comprising:
 detecting alignment of an optical element that is coupled to a flexure;
 moving the optical element laterally by applying laser to at least a side portion of the flexure; and
 moving the optical element vertically by applying laser to one or more of:
 (i) a top surface of the flexure to move the optical element upward; and
 (ii) a bottom surface of the flexure to move the optical element downward.

18. The method of claim 17, wherein the optical element is moved toward one selected from an optical transmitter and an optical receiver.

19. The method of claim 17, wherein said applying the laser comprises providing laser pulses at periodic locations along a linear path on the side portion of the flexure.

20. The method of claim 17, wherein said detecting alignment of the optical element comprises detecting alignment of one or more optical fibers.

21. The method of claim 17, wherein applying laser comprises using an optical fiber to apply laser to the flexure.

22. The method of claim 17, further comprising aligning the optical element to one or more selected from an optical transmitter and an optical receiver.

23. The method of claim 17, further comprising aligning the optical element with sub-micron precision, wherein the flexure is approximately 20 to 150 microns thick, wherein the optical element comprises an optical fiber, and wherein the optical fiber is aligned to one or more selected from an optical transmitter and an optical receiver.

* * * * *

UNITED STATES PATENT AND TRADEMARK OFFICE
CERTIFICATE OF CORRECTION

| | | |
|---|---|---|
| PATENT NO. | : 7,013,071 B2 | Page 1 of 1 |
| APPLICATION NO. | : 10/335121 | |
| DATED | : March 14, 2006 | |
| INVENTOR(S) | : Sell | |

It is certified that error appears in the above-identified patent and that said Letters Patent is hereby corrected as shown below:

In column 3, at line 23, delete "redetermined" and insert --re-determined--.

Signed and Sealed this

Tenth Day of February, 2009

JOHN DOLL
*Acting Director of the United States Patent and Trademark Office*